US007531230B2

(12) United States Patent
Marmaropoulos

(10) Patent No.: US 7,531,230 B2
(45) Date of Patent: May 12, 2009

(54) FABRIC DISPLAY

(75) Inventor: George Marmaropoulos, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 240 days.

(21) Appl. No.: 10/571,885

(22) PCT Filed: Sep. 29, 2004

(86) PCT No.: PCT/IB2004/051921

§ 371 (c)(1), (2), (4) Date: Mar. 13, 2006

(87) PCT Pub. No.: WO2005/034067

PCT Pub. Date: Apr. 14, 2005

(65) Prior Publication Data

US 2007/0076407 A1 Apr. 5, 2007

Related U.S. Application Data

(60) Provisional application No. 60/508,497, filed on Oct. 3, 2003.

(51) Int. Cl.
*B32B 33/00* (2006.01)
*B32B 3/02* (2006.01)
*A41D 1/00* (2006.01)

(52) U.S. Cl. ........................... 428/90; 428/85; 428/913; 428/542.2; 428/542.6; 428/543; 2/905; 2/906

(58) Field of Classification Search .................. 428/90, 428/542.2, 542.6, 543, 913; 2/902, 905, 2/906

See application file for complete search history.

(56) References Cited

U.S. PATENT DOCUMENTS

| | | | | |
|---|---|---|---|---|
| 3,575,778 | A * | 4/1971 | Wilcox | 428/88 |
| 4,659,619 | A * | 4/1987 | Tate | 428/321.5 |
| 5,047,103 | A * | 9/1991 | Abrams et al. | 156/72 |
| 5,077,116 | A * | 12/1991 | Lefkowitz | 428/141 |
| 5,207,851 | A * | 5/1993 | Abrams | 156/230 |
| 5,346,746 | A * | 9/1994 | Abrams | 428/195.1 |
| 5,575,554 | A * | 11/1996 | Guritz | 362/103 |
| 5,683,747 | A * | 11/1997 | Hamon | 427/203 |
| 6,210,771 | B1 * | 4/2001 | Post et al. | 428/100 |
| 6,397,390 | B1 * | 6/2002 | Henderson et al. | 2/69 |
| 6,535,102 | B2 * | 3/2003 | Marmaropoulos | 338/6 |
| 6,755,795 | B2 * | 6/2004 | Marmaropoulos et al. | 600/587 |
| 6,974,783 | B2 * | 12/2005 | Akdogan et al. | 442/110 |
| 7,115,842 | B2 * | 10/2006 | Keane | 219/494 |

(Continued)

FOREIGN PATENT DOCUMENTS

JP 08137198 A * 5/1996

(Continued)

*Primary Examiner*—Cheryl Juska

(57) ABSTRACT

The present invention provides a fabric display using the action of electrostatic charges to manipulate visual displays. The fabric display comprises areas of furry fabrics (16) that can serve as visual effects or display of information and can be usable in a wearable garment, furniture, or other suitable locations where it can be incorporated to close a circuit. Through activation by the user, the surface of furry fabrics (16) is electrostatically charged causing the furs to repel from the surface and each other in a substantially vertical orientation with portions of the furs extending cut of the surface, thus revealing the color of the fabric surface.

19 Claims, 1 Drawing Sheet

U.S. PATENT DOCUMENTS

| | | | | |
|---|---|---|---|---|
| 7,210,939 | B2 * | 5/2007 | Marmaropoulos et al. | 439/37 |
| 7,211,053 | B2 * | 5/2007 | Marmarpoulos et al. | 600/587 |
| 2003/0129353 | A1 * | 7/2003 | Abrams | 428/88 |
| 2006/0128328 | A1 * | 6/2006 | Shah | 455/178.1 |
| 2007/0026189 | A1 * | 2/2007 | Abrams | 428/90 |
| 2007/0076407 | A1 * | 4/2007 | Marmaropoulos | 362/103 |
| 2007/0148399 | A1 * | 6/2007 | Chen | 428/96 |

FOREIGN PATENT DOCUMENTS

JP 08337972 A * 12/1996

* cited by examiner

FABRIC DISPLAY

CROSS REFERENCE TO RELATED APPLICATION

This application claims the benefit of U.S. provisional application Ser. No. 60/508,497 filed Oct. 3, 2003, which is incorporated herein by reference.

The present invention relates to visual fabric articles intended to permit the display of a certain pattern or design. More specifically, the present invention relates to a visual fabric display system that may be implemented in an article of clothing, furniture, or in other location to provide communication and informational or decorative display by the action of electrostatic charges.

The idea of dynamically changing the appearance of the fabric of a garment, for example, is highly desirable and certainly attractive for designers and the fashion industry. There are a number of display devices that utilize informational and decorative manipulatives. Attempts so far include embedded LEDs, thermochromic liquid crystal, and electroluminescent materials applied to the fabrics. However, these techniques employ additional manufacturing efforts and costs.

As described in detail below, it has been found efficacious to use electrostatic charges applied to an area of fabric to realize visual display, and unlike prior art they do not involve the use of additional devices.

The present invention discloses a display fabric system, which includes a fabric layer having at least one conductive layer therein for passing an electrostatic field and a plurality of surfaces having a plurality of furs on the surface thereof, so that selective regions covered by the furs can selectively extend out of the fabric layer in a substantially vertical orientation in response to the electrostatic field, thereby revealing the surface color of the fabric layer. In operation, an electric field is generated by the activation of a user via a conductive layer, so that the selected regions covered by the furs can repel each other and extend out of the fabric layer in a substantially vertical direction. The fabric surface may comprise a plurality of different color surfaces.

According to one aspect of the invention, a garment or furniture of desired form and function can be constructed in a conventional manner using readily available fabrics and materials, and the fabrics serving as a visual display system can be positioned advantageously within a wearable garment or furniture that permits easy manual activation by a person.

According to another aspect of the invention, the garment comprises a shirt, a hat, a jacket, a vest, a fashion accessory or the like.

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
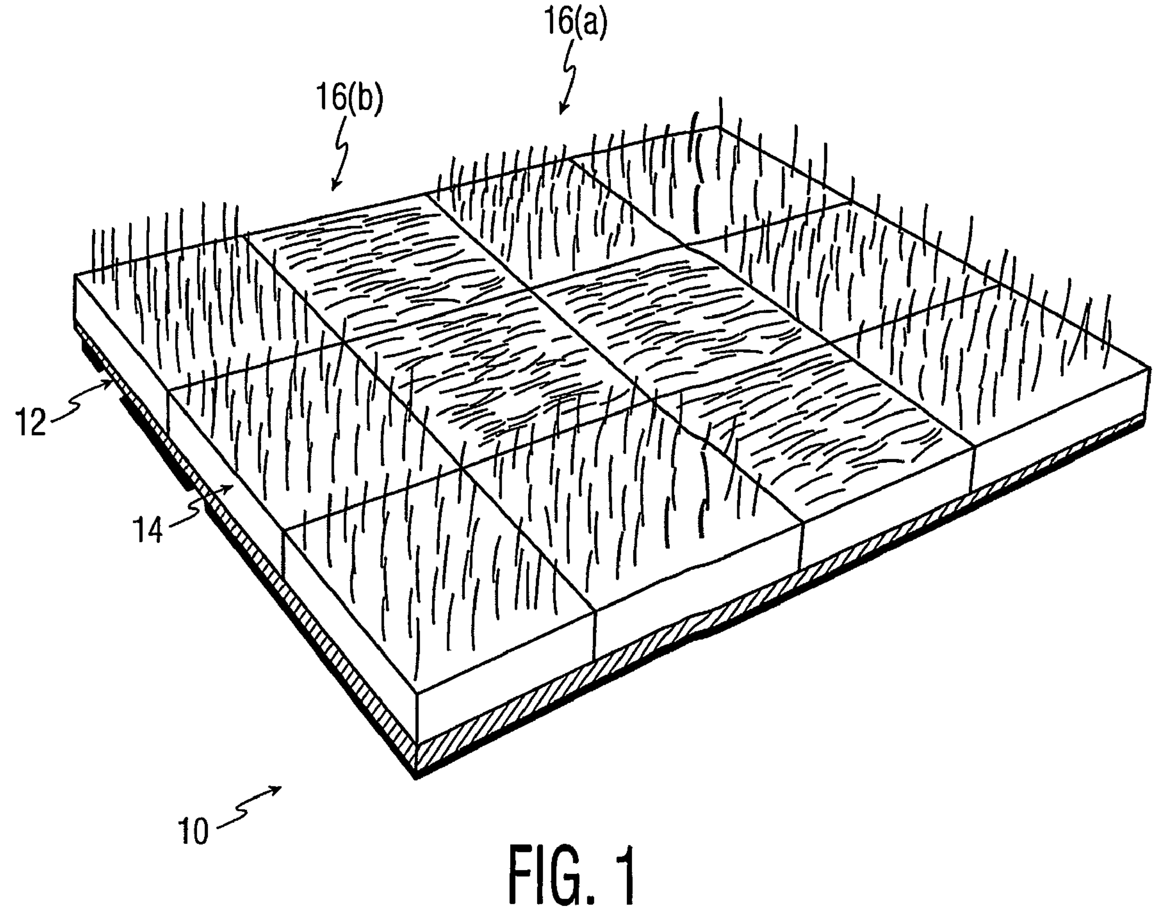
FIG. 1 illustrates an embodiment of a fabric display system in accordance with this invention.

Referring now to FIG. 1 of the drawings, a fabric display system 10 in accordance with this invention includes a fabric layer 14 having a flexible layer 12 of conductive material mounted thereunder. On the top surface of the fabric 14, a fur-like or hair-like 16 is formed thereof (hereinafter referred to as "fur"). The conductive layer 12 may be coupled to a power source in the form of loops to transmit the desired voltage level in conjunction with a user activation switch in any well-known manner, so that a fur-like surface coupled to an electrical power source is able to electrostatically charge the area of the fur-like surface causing a local change in the orientation of the fur.

The embodiment illustrated in FIG. 1 may be incorporated in the form of a conventional sleeveless top shirt, hat, or a short or long-sleeved vest or jacket, for example. In an alternate embodiment, the embodiment of FIG. 1 may be implemented in furniture or in other locations where the layers of electrically conductive layer 12 can be used as a coupling of electrical power for visual display purposes.

Figure 2:
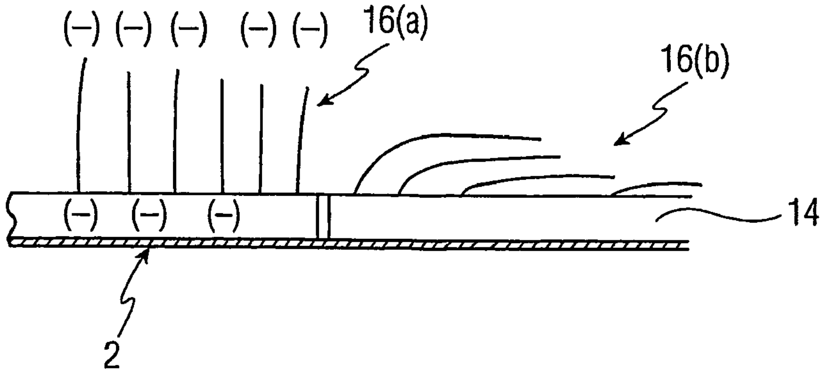
FIG. 2 illustrates a side view of the fabric layer of FIG. 1 in accordance with the embodiment of this invention.

Referring to FIG. 2, the furs 16(*b*) are resting nearly flat and covering most of the surface of the fabric 14 in the normal state. When a given surface of the fabric 14 is electrostatically charged through the activation by the user, then the furs 16(*b*) repel each other and also are repelled by the surface, therefore standing nearly vertical to the surface and revealing the color of the surface. Discharging of an area causes the fur to rest back in their initial position. The charged layer 12 can carry either a positive or negative charge on its outwardly-facing surface in such a way that electrostatic forces that exist in the surface force the furs 16 to repel and extend out of the surface in a substantially vertical orientation, thereby revealing the color of the surface.

The surface of fabric 14 may be divided into a number of predetermined patterns and different colors. Hence, the pattern is determined by the fabric surfaces of different colors as well as the orientation of pieces of fabric that make up the pattern. For example, each area can be considered as a pixel and therefore charging/discharging different areas, a change in the contrast can be achieved which can form a binary image or pattern.

The material of the fabric layer 14 can be either natural or synthetic, and the fabric created from such materials can be either woven or sheet-formed in any well-known manner. For example, the fabric layer 14 can be formed of a material such as cotton, polyester, spandex, a combination thereof, or the like. Alternatively, the fabric layer 14 can be constructed from non-woven (felted) or knitted fabrics or a composite structure. However, in each alternative case, electrically conductive layer 12 is included in the production of the fabric, thus providing electrically conductive layers. The conductive layer 12 may be produced by printing them onto the fabric layer 14 or it may be mounted as adhesive tape. Alternatively, the conductive layer 12 may be produced by printing a material containing conductive particles onto the fabric layer 14. All of the alternatively described methods provide a suitable bond, forming a reliable electrical connection.

While the preferred embodiments of the present invention have been illustrated and described, it will be understood by those skilled in the art that various changes and modifications can be made, and equivalents can be substituted for elements thereof without departing from the true scope of the present invention. Thus, the shape of an interconnect system in the drawings should not impose limitations on the scope of the invention. Therefore, it is intended that the present invention not be limited to the particular embodiment disclosed as the best mode contemplated for carrying out the present invention, but that the present invention include all embodiments falling within the scope of the appended claims.

What is claimed is:

1. A display fabric (10) comprising:

a fabric layer (14) having at least one conductive layer (12) therein for passing an electrostatic field, said fabric layer (14) having a plurality of furs (16), laying nearly flat on the surface thereof, responsive to said electrostatic field to extend out from said fabric layer (14) in a substantially vertical orientation, thereby revealing the surface color of said fabric.

2. The display fabric of claim 1, wherein the surface of said fabric layer (14) includes a plurality of predetermined color pattern surfaces.

3. The display fabric of claim 1, wherein said conductive layer (12) carries a positive or negative charge on its outwardly facing surface so that said electrostatic field that exists within the surface of said fabric layer (14) forces said furs to repel and extend in a substantially vertical orientation.

4. The display fabric of claim 1, wherein said conductive layer (12) serves as a coupling to a power source.

5. The display fabric of claim 1, wherein said fabric layer (14) is coupled to a fabric circuit integrated in a garment.

6. The display fabric of claim 5, wherein said garment is a shirt.

7. The display fabric of claim 5, wherein said garment is a vest.

8. The display fabric of claim 5, wherein said garment is a jacket.

9. The display fabric of claim 5, wherein said garment is a hat.

10. The display fabric of claim 1, wherein said fabric layer (14) is coupled to a fabric circuit integrated in furniture.

11. A method for providing a visual display with a wearable comprising the steps of:

providing a fabric layer (14) having at least one conductive layer (12) therein for passing an electrostatic field and a plurality of furs (16) laying nearly flat on the surface thereof;

dressing a person in said garment provided with said fabric layer (14); and, selectively providing an electrostatic force to a selective region of said conductive layer (12) to force corresponding said furs (16) to extend out from said fabric layer (14) in a substantially vertical orientation, thereby revealing the surface color of said fabric.

12. The method of claim 11, further comprising the step of providing a plurality of predetermined color pattern surfaces on the surface of said fabric layer (14).

13. The method of claim 11, further comprising the step of coupling a power source to said conductive layer (12) to generate an electric field thereon by an activation of said person.

14. The method of claim 11, wherein said garment is a shirt.

15. The method of claim 11, wherein said garment is a vest.

16. The method of claim 11, wherein said garment is a jacket.

17. The method of claim 11, wherein said garment is a hat.

18. A method for providing a visual display with a wearable garment, said method comprising the steps of:

providing a fabric layer (14) having at least one conductive layer (12) therein for passing an electrostatic field and a plurality of furs (16), laying nearly flat on the surface thereof;

integrating said fabric layer (194) in furniture; and, selectively providing an electrostatic force to a selective region of said conductive layer (12) to force the corresponding said furs (16) to extend out from said fabric layer (14) in a substantially vertical orientation, thereby revealing the surface color of said fabric.

19. The method of claim 18, further comprising the step of providing a plurality of predetermined color pattern surfaces on the surface of said fabric layer (14).

* * * * *